No. 724,798. PATENTED APR. 7, 1903.
L. BRUCKMANN.
MACHINE FOR MAKING CHAINS.
APPLICATION FILED SEPT. 17, 1900.
NO MODEL. 5 SHEETS—SHEET 1.

Fig. 1.

Witnesses
F. H. Schott
Anton Gletzner

Inventor
Ludwig Bruckmann
by Max Georgii
his Attorney

No. 724,798. PATENTED APR. 7, 1903.
L. BRUCKMANN.
MACHINE FOR MAKING CHAINS.
APPLICATION FILED SEPT. 17, 1900.
NO MODEL. 5 SHEETS—SHEET 2.

Witnesses
F. H. Schott
Anton Glaetzner

Inventor
Ludwig Bruckmann
by Max Georgii
his Attorney

No. 724,798. PATENTED APR. 7, 1903.
L. BRUCKMANN.
MACHINE FOR MAKING CHAINS.
APPLICATION FILED SEPT. 17, 1900.
NO MODEL. 5 SHEETS—SHEET 3.

Witnesses
F. H. Schott
Anton Gleffner

Inventor
Ludwig Bruckmann
by Max Georgii
his Attorney.

No. 724,798. PATENTED APR. 7, 1903.
L. BRUCKMANN.
MACHINE FOR MAKING CHAINS.
APPLICATION FILED SEPT. 17, 1900.
NO MODEL. 5 SHEETS—SHEET 5.

Witnesses
F. H. Schott
Anton Glotzner

Inventor
Ludwig Bruckmann
by Max Georgii
his Attorney

UNITED STATES PATENT OFFICE.

LUDWIG BRUCKMANN, OF PFORZHEIM, GERMANY.

MACHINE FOR MAKING CHAINS.

SPECIFICATION forming part of Letters Patent No. 724,798, dated April 7, 1903.

Application filed September 17, 1900. Serial No. 30,314. (No model.)

*To all whom it may concern:*

Be it known that I, LUDWIG BRUCKMANN, a citizen of the German Empire, residing at Pforzheim, in the Grand Duchy of Baden, Germany, have invented certain new and useful Improvements in Machines for Making Chains; and I do hereby declare the following to be a full, clear, and exact description of the invention, such as will enable others skilled in the art to which it appertains to make and use the same.

This invention relates to means for making chains having soldered links, especially fine chains, such as used for eyeglasses, necklaces, and the like purposes.

The object of the invention is to produce a machine that will automatically produce such a chain from a metal wire, doing away with the need of skilled labor for the purpose.

The apparatus comprises, in substance, means for winding a helix from a roll of wire, means for severing one winding of the helix to form an open link, means for hooking this open link into a previously-formed link, means for closing the open link, means for bringing the link in contact with a soldering-flux, means for depositing solder on the link, and means for applying heat to the link to fuse the solder, and thus solder the link.

My invention consists, further, in such construction and arrangement of parts, either separately or in combination, as will be hereinafter described, and pointed out in the claims.

In the accompanying drawings, representing a machine embodying my invention.

In the drawings, $a$ designates the base of the machine, on which is secured at one end two posts $b$ $b$. The upper part of these posts carries the shaft $c$, at one end of which is secured the driving-wheel 1, shown as a hand-wheel; but this may be supplanted by a belt or other means for driving the shaft $c$ by power. Another shaft $c'$ is also mounted on the posts $b$ $b$, having a gear-wheel $d'$, meshing with a gear-wheel $d$, secured on the shaft $c$. This shaft $c'$ carries also a gear $e$, that serves to rotate a shaft $f$, carried by the uprights 2 and 3, by meshing with a gear $e'$ on this latter shaft.

Figure 7:
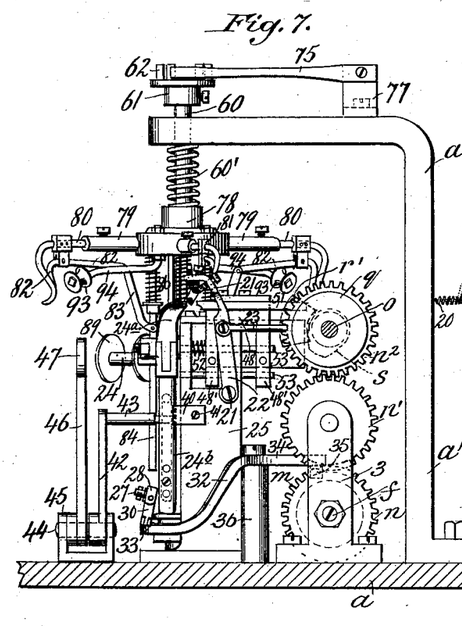
Fig. 7 is an end elevation of the parts shown in Fig. 5.
Figure 8:
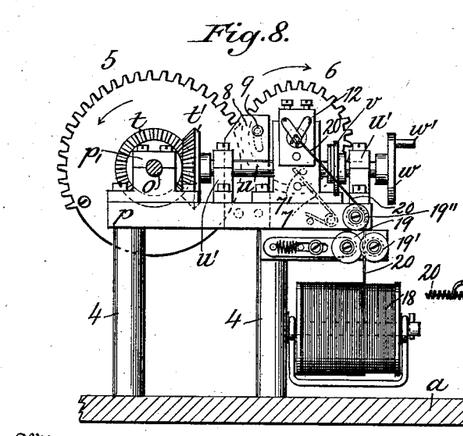
Fig. 8 is a section on the line C C of Fig. 2.
Figure 9:
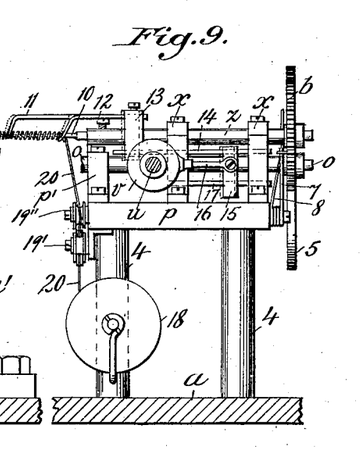
Fig. 9 is a side elevation of the parts shown in Fig. 8.
Figure 10:
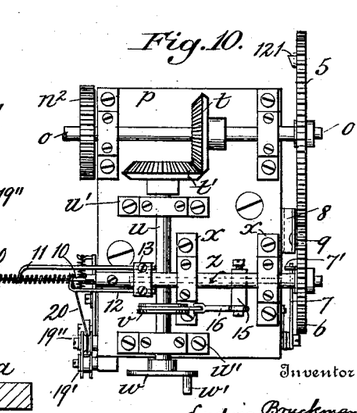
Fig. 10 is a plan view of the part shown in Figs. 8 and 9.

At the other end of the machine from that containing the main driving-wheel 1 is located a table $p$, supported by posts 4. (See Figs. 8, 9, and 10.) On this table a shaft $o$ is mounted in boxes $p'$ $p'$, which is rotated by a gear-wheel $n^2$, that is driven from a gear-wheel $n$, mounted on the said shaft $f$ through an intermediate gear-wheel $n'$, carried by the support 3. (See Fig. 7.) A shaft $z$ is also carried on the table $p$ by journal-boxes $x$ $x$, being arranged parallel with the said shaft $o$. This latter shaft drives the shaft $z$ intermittently by means of a gear-wheel 5, having teeth on half only of its periphery engaging a gear-wheel 6 of half the periphery of the wheel 5. Hence when the wheels are in mesh the half-revolution of the wheel 5 will cause one revolution of the wheel 6, while during the other half-revolution of the wheel 5 the wheel 6, and consequently the shaft $z$, will remain idle. In order to prevent any further movement of the shaft $z$ after the gears 5 and 6 have passed out of mesh, a spring 8 is secured to the table $p$, that has a lug 9, which engages a cavity in the wheel 6 and holds it stationary. When the wheel 5 moves around and its toothed portion comes into mesh with the wheel 6, a beveled lug 121 on the wheel 5 strikes the spring 8 and forces its lug 9 out of the cavity in the wheel 6 and releases this wheel. Near the front edge of the table is secured a spring-brake 7, bearing on a pin 7' on the wheel 6, which serves to retard the motion of the shaft $z$ when the wheels are about to go out of engagement. The free extremity of the shaft $z$ has a rod 10 projecting from one end, upon which a wire 20 from the reel 18, mounted on a post 4, is wound in the form of a helix. The helix is guided on the rod 10 by two arms 11 and 12, that have forked extremities which straddle the rod 10 and also serve to form separated convolutions of the helix. The guide 12 has the wire 20 passing between its forks as it comes in contact with the winding-rod 10. These guide-rods 11 and 12 are secured to a box 13, arranged to reciprocate on the shaft $z$.

A shaft $u$ is journaled in bearings $u'$ $u''$ on the table $p$, arranged at right angles to the shaft $o$, by which it is driven through the medium of the bevel-gear $t$ on the shaft $o$, engaging an equal-size bevel-gear $t'$ on the shaft $u$. On the shaft $u$ is arranged an eccentric $v$, having an eccentric-rod 16, whose free end is connected with a box 15. This box is supported to be reciprocated by the rod 16 on two rods 14 and 17, secured to the box 15 and sliding in apertures in the standards $x$ $x$. The rod 14 is elongated and has this end secured to the box 13, by which means one revolution of the shaft $u$, driven by the shaft $o$, will cause one reciprocation of the arms 11 and 12. Now the shaft $z$, and consequently the winding-rod 10, makes one revolution while the shaft $o$ is making one-half of a revolution. Hence the shaft $u$ will rotate the eccentric so as to move the arms 11 and 12 but one-half of a full reciprocation, whereas the shaft $z$ is held stationary during the other half-revolution of the shaft $o$. Hence the rod 10 will be stationary during the other half-reciprocation of the arms 11 and 12. The eccentric $v$ is so adjusted and positioned on the shaft $u$ that when the rod 10 is making a revolution the guide-arms 11 and 12 will be making the full movement in the direction in which the helix is being wound, and the movement of the guide 12 will thus correspond to the formation of the helix around the rod 10, as it were, it being, in fact, moved backwardly on the rod for the distance of one winding of the helix; but the rod 10 is held stationary during the other half-revolution of the shaft $o$, and hence there is no winding of the helix. While the eccentric $v$ is causing the guides 11 and 12 to move in the opposite direction along the winding-rod the helix will be advanced along the rod and in the opposite direction to that in which it is wound thereon.

If desired, a tension device may be used to keep the wire 20 from becoming kinked and snarled, such as a pulley 19, that is forced in contact with a guide-pulley 19' by a spiral spring that has its other end secured to a bolt secured to a cleat on the table $p$. There is also a guide-pulley 19'', over which the wire 20 passes from the tension device to the winding-rod.

In proximity to the free end of the helix are a pair of grasping-arms $24^a$ $24^b$ or pincers, mounted on a pivot 24, secured on an upright 55, that is mounted on the base $a$. The arm $24^b$ has a helical spring 38 attached to its handle portion, the other extremity of the spring being secured to a post 39, mounted on the base $a$. This spring tends to draw the arm $24^b$ toward the closed position of the arms. To limit this movement, a detent 40 is secured to the grasping-arm $24^b$, which arm has a bent part containing a stop-screw 41, that impinges on the side of the upright 55. (See Fig. 7.) This screw 41 serves to adjust the limit of the movement of said arm. To move the grasping-arm $24^b$ against the force of the helical spring 38, a pair of levers 42 46 are mounted on a common pivot 44, that is supported in a bearing 45 on the base $a$. The arm 42 has a projection 43, arranged to impinge on the inner side of the arm $24^b$. A disk $w$ is mounted on one extremity of the shaft $u$ and has a crank-pin $w'$, that is arranged to impinge on the free extremity of the lever 46, having a beak 47, thus depressing this lever and causing the lever 42 to move the grasping-arm $24^b$ and open the members. The other grasping-arm, $24^a$, is operated by the lever system 30 34. A short arm 28 is connected with the extremity of the grasping-arm by a screw 27, passing through a slot 29 in the arm 28 and secured in arm $24^a$. A lever 30 connects by a hinge-joint at each extremity the arm 28 with a bent lever 32, mounted on a post 36 on the base $a$. The arm 33 of this bent lever is connected by hinge-joints with the lever 30 by a short intermediate lever 31. The arm 34 of the bent lever 32 has a roller pivotally mounted on its lower side that engages the walls of a double-stepped cam-groove located in the convex surface of a drum $m$, mounted on the shaft $f$, (see Fig. 7,) which combination of parts serve to give an intermittent movement to the arm $24^a$, that will be more fully explained hereinafter.

Figure 5:
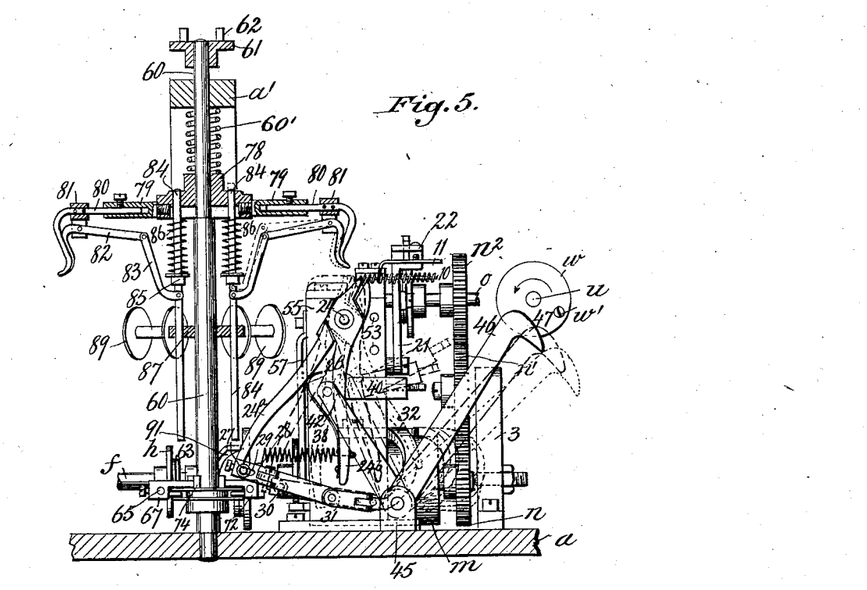
Fig. 5 shows the mechanism for forming the link, in side elevation and on a larger scale.

A vertical shaft 60 has one end journaled in the base $a$, while the upper extremity is supported in an aperture in a bent standard $a'$, bolted to the base $a$. (See Fig. 7.) On the reduced upper part of the shaft 60 is secured a hub-disk 78, from which radiate four sockets 79, being rigidly secured therein. (See Fig. 5.) In each of these sockets is secured, preferably adjustably, a bent grasping-arm 80, having pivoted thereto by a box 81 another grasping-arm, 82, the free ends of which arms come together, so as to grasp a link. Each of the arms 82 is operated through a connecting-lever 83 by a vertical reciprocating rod 84, which rods are mounted in apertures in the disks 78 and 87. A helical spring 86 is arranged on each of the rods 84 between the disk 78 and a collar 85, which serve to keep the grasping-arms normally closed. When it is desired to have a pair of arms open and release a link, a lever 91, pivoted on a block 92, secured to the base $a$, has one extremity arranged to impinge on the lower end of one of the rods 84, when the other end of the lever 91 is depressed at certain predetermined intervals by crank-pins $i'$ on a disk $i$, secured on the shaft $f$. The shaft 60 is caused to revolve by a step-by-step motion in four steps in order to bring each of the grasping-arms 80 82 to a certain position of pause in proximity to the axis of the winding-shaft 10. To effect this movement, a disk 73 is mounted on the lower part of the shaft 60, having on its upper face four pins 74.

An eccentric $k$ is mounted on the shaft $f$, having an eccentric rod or lever 69, to which latter is hinged a rod 70. On the rod 70 is secured a beak 72, having a beveled free extremity that engages one of the pins 74 when the eccentric-rod moves in the direction of the arrow, but when the eccentric moves in the other direction the bevel will cause the rod 70 to turn on its hinge connection with the rod 69 and pass by the pin 74 without moving the shaft 60. A spring 71 tends to keep the rods 69 and 70 in line with each other. The disk 73 has a groove in its periphery, in which projects a pin on each of the beaks 67 and 72 to prevent displacement of the beaks. A similar arrangement of parts is arranged to act on the pins 74 on the opposite side of the disk 73, comprising an eccentric $h$, eccentric-rod 64, hinged rod 65, spring 66, and beak 67; but it will be observed that the eccentric $h$ is smaller than eccentric $k$. Hence the beak 67 will not move the disk 73 as far as the beak 72. The function of these parts will appear hereinafter.

Figure 1:
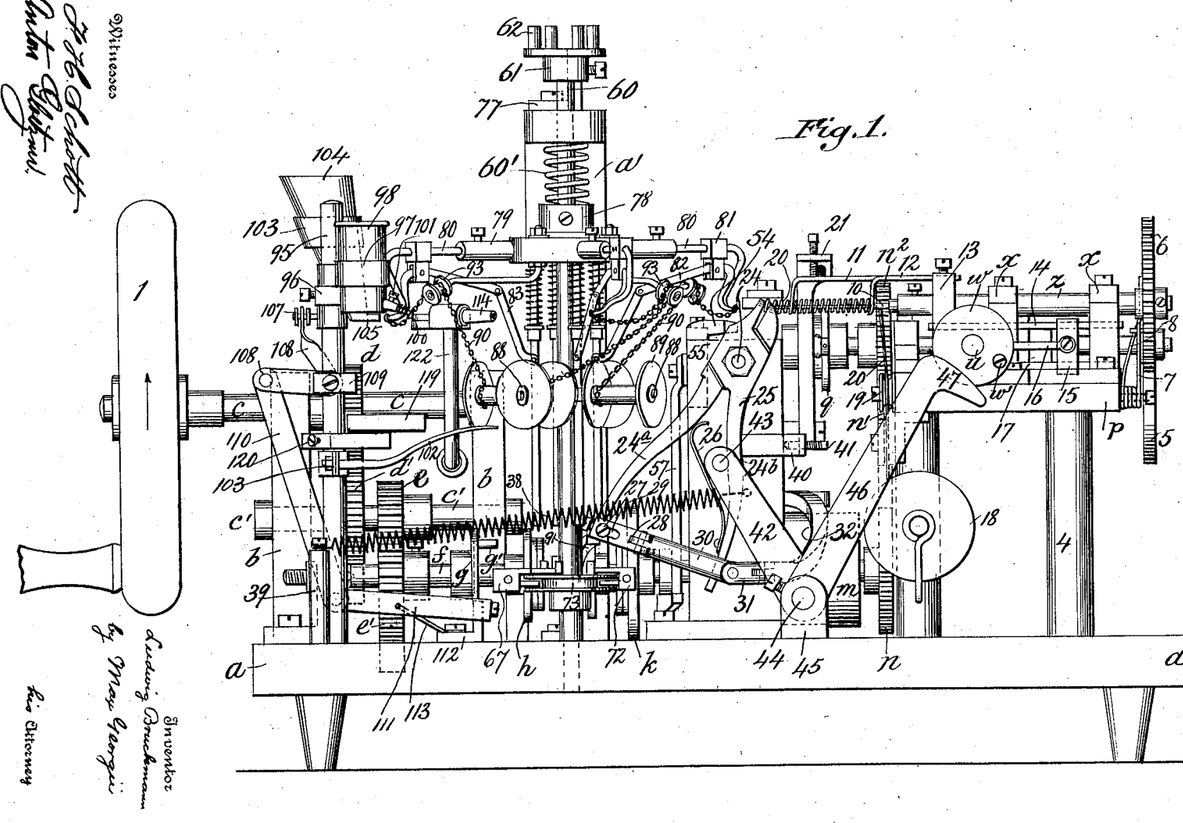
Figure 1 is a side elevation of a machine embodying my invention.
Figure 2:
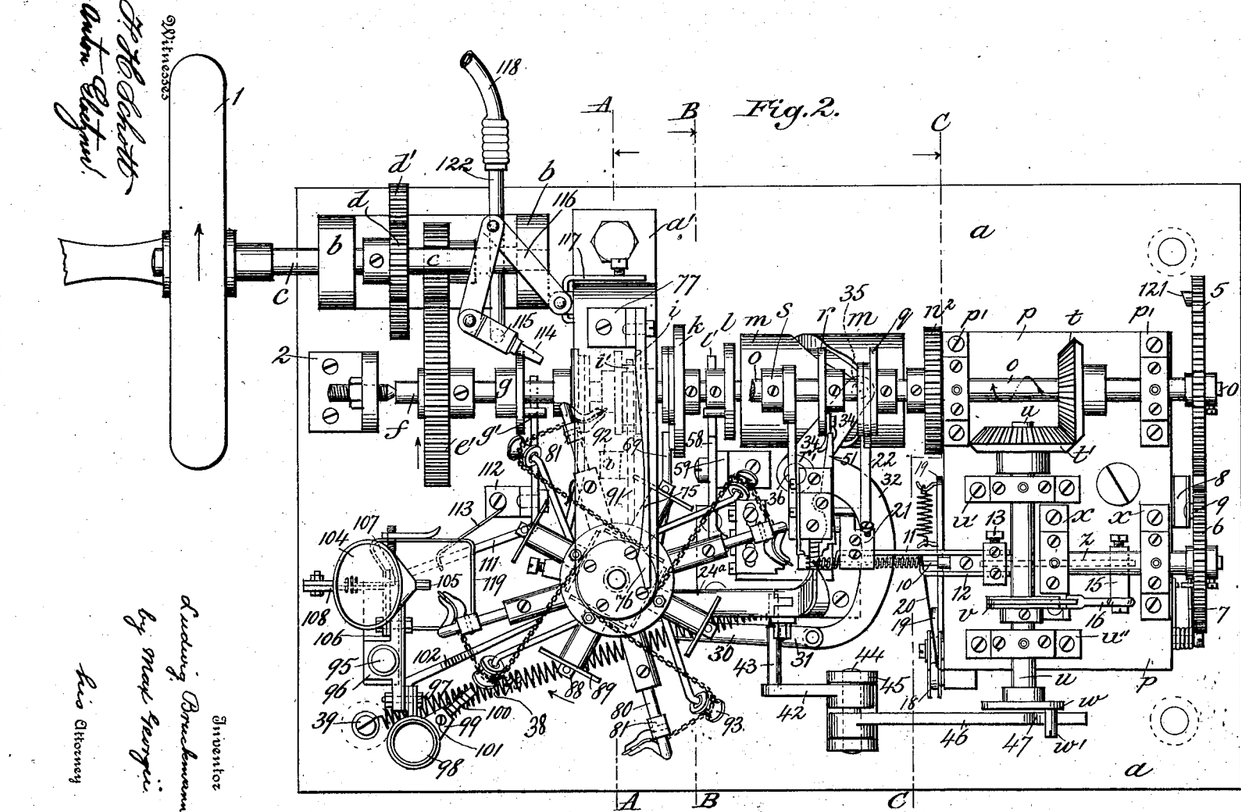
Fig. 2 is a top plan view.
Figure 3:
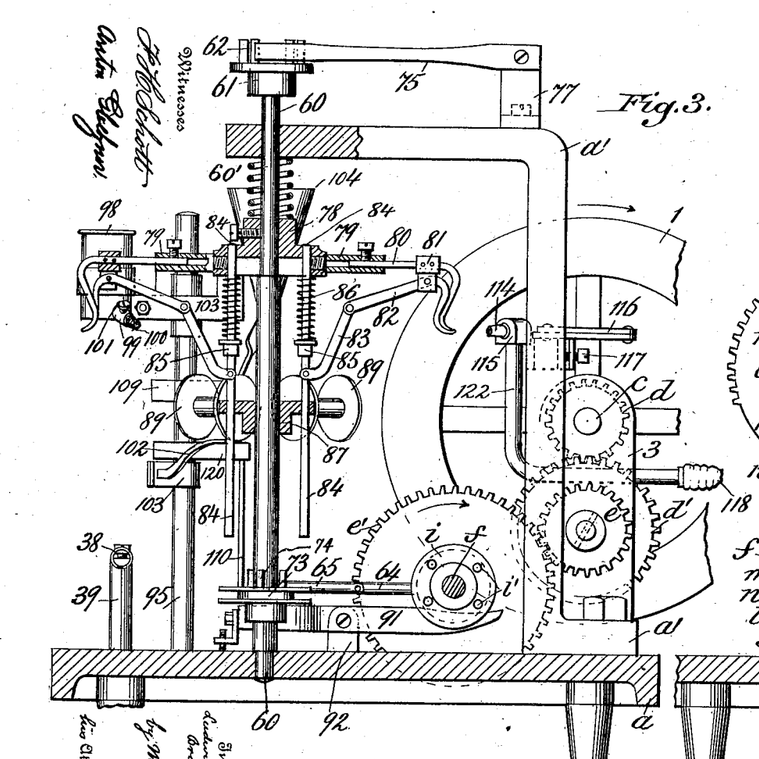
Fig. 3 is a section on the line A A of Fig. 2.

A helical spring 60' is inserted between the hub 78 and the standard $a'$ to retard the motion of the shaft 60 after it has been rotated the required distance by the eccentrics. There is also arranged a spring 75, secured to a bracket 77 on the standard $a'$. The free end of this spring is pressed against pins 62, projecting upwardly from a disk 61, that is mounted on the upper end of the shaft 60. There are four of these pins 62, so that the spring tends to press against two of them and to retain the shaft in some one of these four positions in its revolution. The side of the spring contacting with these pins has an apex 76, as shown in Fig. 2.

In the path of movement of the link held by the arms 80 82 is a vessel 98 for containing liquid flux, supported from an upright post 95, carrying a box 96, to which is secured a bracket 97, passing around the vessel. This vessel has a wick-tube 99, containing a wick 100 and an adjusting-screw 101, for controlling the feeding of the liquid. The wick is so arranged that the link will brush against it in its movement, and thus receive a quantity of the flux. Further in the path of movement of the link supported by the arms 80 82 is a vessel 104, for containing powdered solder. This vessel is supported by a brace 106, secured to the box 96. At the bottom of this vessel is a tube 105, carrying a plunger 107. This plunger is reciprocated through the medium of a bent lever 108, pivoted on a box 109, secured on the post 95, and a bent lever 111, pivoted on a bracket 112, having one arm connected by a lever 110 to the lever 108, while its other arm is arranged to be moved by a pin $g'$ on a disk $g$, mounted on the shaft $f$. A spring 113 is provided to hold the lever 111 constantly in the path of the pin $g'$. Each time the plunger is reciprocated a small quantity of solder is forced out of the tube 105. The end of the tube is arranged to be immediately over the link and preferably at one of its intervals of movement, so that the solder will fall upon it. The surplus solder not attaching itself to the link that has been already moistened by the liquid flux will be caught in a basin 119, carried by a support 120, secured to the post 95. Still further in the path of movement of the link held by the arms 80 82 is arranged a torch or gas-tip 114, projecting from a box 115, carried by a set of pivoted levers 116, that are secured by a clamp 117 to the standard $a'$. The box 115 has a gas-pipe 122 leading from it, which is connected with a gas-supply by a flexible tubing 118.

Figure 4:
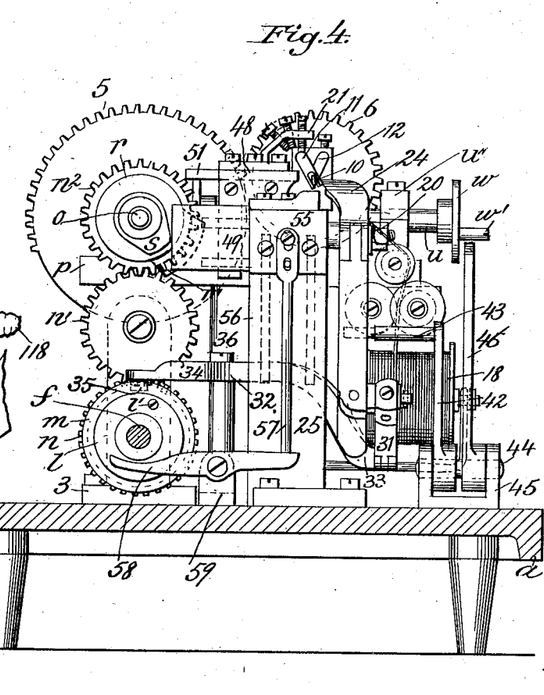
Fig. 4 is a section on the line B B of Fig. 2.
Figure 6:
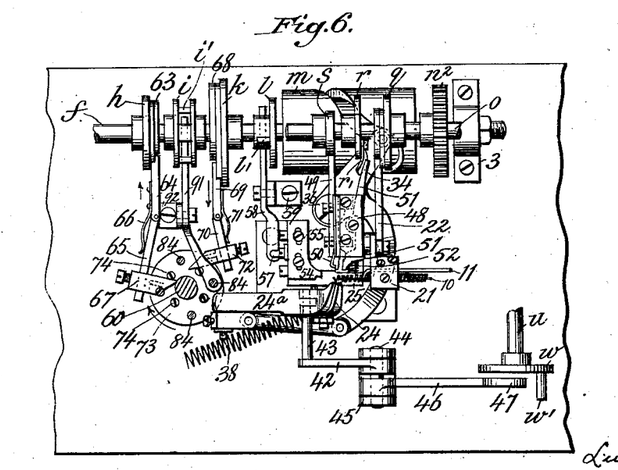
Fig. 6 is a top plan view of the parts shown in Fig. 5.

As the chain 90 is formed by each of the grasping-arms 80 82 it is carried over guide-wheels 93 and wound on reels 89, mounted on pins 88, that radiate from the disk 87. When these reels are carried around by their supporting-shaft 60, they each have the outer rim to brush on a spring 102, that is secured by a clamp 103 to the post 95, and thereby are given a partial rotation to wind up the chain 90 as formed. When the last winding of the helix is to be grasped by the pincers $24^a$ $24^b$, the guide-arm 11 is made to deflect the helix toward the pincers and force the winding between the arms by means of a lever 22, (see Fig. 7,) pivoted at 21 on the standard 25, connected by an eccentric-rod 23 with an eccentric $q$, mounted on the shaft $o$. The free end of the lever 22 has three adjusting-screws, the extremities of which contact with the rod 11. When the pincers have grasped the last winding, it is severed from the helix by means of knives 50 and 51. The knife 50 is rigidly secured to a block 48, (see Figs. 6 and 7,) having two members 48' 48', that support the block 48 on rods 53 53, secured to the standard 25. A spring 52 tends to force the block 48 away from the helix, against which it is moved by a rod 49, secured to the block 48, whose free extremity is arranged in the path of a cam $s$, mounted on the shaft $o$. This cam has a part of its contacting edge concentric with its movement, so that when the block and knives are forced over toward the helix they will be held there for a short time. In this position the knife 51, that is pivoted on the block 48, has its rear extremity arranged in the path of movement of a wing $r'$, secured on a disk $r$, that is mounted on the shaft $o$, which wing impinging on the end of the knife-blade causes its cutting end to approach the fixed blade 50 and sever the winding, thus forming an open link. After the open link has been formed it is carried forward and at the proper time it is closed by being pressed against the nose 54 of a block 55. This block has a pair of rods 56 56 secured to it, which reciprocate in apertures in the upright 25. (See Figs. 4 and 6.) A lever 58 is pivoted on a bracket 59 on the base $a$ and has one extremity depressed by a pin $l'$ on a disk $l$, secured on the shaft $f$. The other end of the lever 58 impinges on the end on a rod 57, whose other extremity is secured to the block 55, thus raising the block every time the crank-pin strikes the lever.

The operation of the machine is as follows: A certain amount of helix having been wound on the rod 10 the pincers are placed by the levers 30 34 and cam $m$ in the position nearest the winding devices and the jaws somewhat opened. Then the rocking-lever 22 is moved by its eccentric to impinge on the guide-rod 11 and cause it to force the last winding of the helix into the opened jaws, whereupon the arm $24^a$ is at once moved by the said lever to close upon the other arm and grasp the winding. Then the arm 22 retreats and the pincers advance a slight distance to draw the last winding out somewhat. Now the knives 50 51 are moved into contact with this end winding by the eccentric-rod 49 and immediately the wing $r'$ forces the knife-blade 51 toward the other blade and severs the winding, thus forming a link with separated ends—that is, what is known as an "open" link. This link is now advanced by the pincers being rocked through the levers 30 34 and hooked into a previously-formed link, being held by one pair of grasping-arms 80 82 and in a position in line with the helix, which arms have just been brought to this position on the rotation of the shaft 60 by the eccentric-rod 69. As soon as the link is hooked on the lever 91 is rocked by the crank $i$ and through one of the rods 84 opens the said grasping-arms 80 82 and releases the link and chain 90, which will hang from the open link still held by the pincers. At this stage of the operation the extremity 76 of the spring 75 will so act on the pins 62 as to cause a backward rotation of the shaft 60 as the eccentric-rod 69, with its beaks 72, retreats for a very short distance, so as to remove the arms 80 82 from the vicinity of the link. Thereupon the block 55 is raised into line with the helix by the lever 58, &c., and the pincers are now advanced still farther by the levers 30 34, so that the ends of the link are pressed against the beak 54 and brought together—that is, the open link is thereby closed. Then the block 55 at once lowers, and the pincers begin their return movement. They at first bring the now-closed link to its former position, where it was hooked on the previously-formed link, and thereupon the eccentric-rod 64 and connected parts move the shaft 60 forward to its former position and bring the arms 80 82, that are again opened by another pin $i'$ on the disk $i$, rocking the lever 91, to grasp the just-closed link. The next movement of the apparatus brings the crank-pin $w'$ to strike the bent lever 42 46 and, rocking it, moves the grasping-arm $24^b$, thus opening the pincers, leaving the just-closed link on the arms 80 82, and then the pincers return to their former position to have another winding put into them and form another link in the manner just described. During the revolution of the shaft supporting the four arms 80 82 in the four-stepped movement previously described each link is first brushed against the wick 100 and coated with flux and then brought to rest at the next pause in its rotation under the vessel containing the powdered solder, where the plunger forces the solder from the tube onto the link, and the flux causes it to adhere, and, lastly, the link at its third pause is acted on by the flame to cause the solder to flow and unite the ends of the link. The next step in the rotation brings the just-soldered link to its former position, where it has another link added in the manner just described. It will thus be apparent that four separate chains are being formed from the wire, one for each of the arms 80 82. There can be a greater or less number of these or only one pair and a single chain made. The winding-rod 10 being cylindrical, a circular link will be formed; but this might be made elliptical or of other shape to produce a desired shape of link.

What I claim, and desire to secure by Letters Patent of the United States, is—

1. The combination with an actuating means, of means operated thereby for forming a link from wire, means operated from said actuating means for joining the ends of said link by solder.

2. The combination with an actuating means, of means operated thereby for forming a link from wire, means operated from said actuating means for joining the ends of said link by solder, and means for adding another link to said soldered link.

3. The combination with an actuating means, of means operated thereby for forming a link from wire, means operated from said actuating means for joining the ends of said link by solder, means for adding another link to said soldered link and then soldering said latter link by said means for joining the ends of a link, said several means arranged to continuously form a link connected with a previously-soldered link, and then solder the added link.

4. The combination with an actuating means, of means operated thereby for forming a link from wire, means operated from said actuating means for joining the ends of said link by solder, means for adding another link to said soldered link and then soldering said latter link by said means for joining the ends of a link, said several means arranged to continuously and simultaneously form a link connected with a previously-soldered link, and then solder the said link.

5. The combination with an actuating means, of means operated thereby for forming a wire link, means operated by said actuating means for next applying flux to the joint of said link, means operated by said actuating means for next applying solder to said link, and means operated by said actuating means for next applying heat to said link to solder its ends together.

6. The combination with an actuating means, of means operated thereby for forming a wire helix, means for severing a link from said helix, and means for joining the ends of said link by solder.

7. The combination with an actuating means, of means operated thereby for forming a wire helix, means for severing a link from said helix, means for bringing the ends of said link together, and means for joining the ends of said link by solder.

8. The combination with an actuating means, of means operated thereby for forming a wire helix, means for severing a link from said helix, means for joining the ends of said link by solder, means for forming another link from said helix and means for hooking said latter link into the soldered link.

9. The combination of a driving-shaft, a toothed wheel on said driving-shaft having teeth on part only of its periphery, a winding-shaft, a toothed wheel on said winding-shaft driven by said partly-toothed wheel, a pin secured to said toothed wheel, a spring secured to the frame of the machine and arranged to bear on said pin and thereby retard the movement of the winding-shaft at the latter part of its motion, a spring secured on the frame of the machine and having a lug adapted to engage the toothed wheel, and a pin on the partly-toothed wheel adapted to impinge against said spring and withdraw its lug from engagement with the toothed wheel.

10. The combination of a winding-shaft, a toothed wheel on the winding-shaft, a driving-shaft, a toothed wheel on the driving-shaft having teeth on part only of its periphery for driving the winding-shaft intermittently, a pin secured to said wheel on the winding-shaft, and a spring secured to the frame of the machine and arranged to bear on said pin and thereby retard the movement of said driven wheel at the latter part of its motion.

11. The combination of a winding-shaft, a toothed wheel on said shaft having a cavity therein, a driving-shaft, a toothed wheel actuated from the driving-shaft having teeth on part only of its periphery for driving the winding-shaft intermittently, a spring-lever secured to the frame of the machine, a projection on said lever arranged to engage said cavity in the toothed wheel on the driving-shaft and thereby hold said wheel stationary when said partly-toothed wheel is not actuating said other wheel, a pin secured to said wheel on the winding-shaft, and a spring secured to the frame of the machine and arranged to bear on said pin and thereby retard the movement of said driven wheel when said lever is about to engage said cavity.

12. The combination of a shaft, means on the shaft for winding a wire helix, a driving-shaft, means for causing said latter shaft to rotate said former shaft intermittently, and means for causing said driving-shaft to advance said helix on said winding means when said winding-shaft is not rotating.

13. The combination of a shaft, means on the shaft for winding a wire helix, a toothed wheel on said shaft, a driving-shaft, a toothed wheel on said driving-shaft having teeth on part only of its periphery for rotating the winding-shaft intermittently, and means for causing said driving-shaft to advance said helix on said winding means when the winding-shaft is not rotating.

14. The combination of a shaft, means on the shaft for winding a wire helix, a toothed wheel on said shaft, a driving-shaft, a toothed wheel on the driving-shaft of twice the perimeter of said toothed wheel on the winding-shaft and having teeth on half only of its perimeter for rotating the winding-shaft once during one half of its own rotation and then leaving the winding-shaft stationary during the other half of its revolution, and means for causing said driving-shaft to advance said helix on its winding means during the said half-rotation that the winding-shaft is stationary.

15. The combination of a winding-shaft, a rod projecting axially from said shaft, a driving-shaft, means for causing said driving-shaft to rotate said winding-shaft intermittently, an arm having a forked end arranged to straddle said rod and to guide the wire winding on the rod, and means connected with said driving-shaft for reciprocating said forked arm along the said rod.

16. The combination of a winding-shaft, a rod projecting axially from said shaft, a driving-shaft, means for causing said driving-shaft to rotate said winding-shaft intermittently, an arm having a forked end arranged to straddle said rod and to guide the wire winding on the rod, means connected with said driving-shaft for reciprocating said forked arm along said rod, said arm being moved in the direction to follow the wire forming the helix while the winding-shaft is rotating, and being moved in the opposite direction to advance the helix on its winding-rod during the period the winding-rod is not rotating.

17. The combination of a winding-shaft, a rod projecting axially from said shaft, a driving-shaft, means for causing said driving-shaft to rotate said winding-shaft intermittently, an arm having a forked end arranged to straddle said rod and to guide the wire winding on the rod, another arm rigidly connected with said arm and having a forked end also straddling said rod for advancing the forward portion of the helix along its winding-rod, and means connected with said driving-shaft for reciprocating said forked arms along said rod.

18. The combination of a driving-shaft, a shaft driven from said shaft, means on said latter shaft for winding a wire helix, a box, a support on which said box can reciprocate, a pair of arms carried by said box and arranged to control said helix, a second shaft driven by said driving-shaft, an eccentric mounted on said latter shaft, and means for causing said eccentric to reciprocate said box and arms.

19. The combination of a driving-shaft, a shaft driven by said driving-shaft, means on said latter shaft for winding a wire helix, a box arranged to reciprocate on said winding-shaft, a pair of arms carried by said box and arranged to control said helix, a second shaft driven by said driving-shaft, an eccentric mounted on said latter shaft, and means for causing said eccentric to reciprocate said box and arms.

20. The combination of a driving-shaft, a shaft driven from said shaft, means on said latter shaft for winding a wire helix, a box, a support on which said box can reciprocate, a pair of arms carried by said box and arranged to control said helix, a second shaft driven by said driving-shaft, an eccentric mounted on said latter shaft, a second box, a support on which said latter box can reciprocate, a rod connecting said reciprocating boxes to cause them to move together, and an eccentric-rod connecting said eccentric with said second box.

21. The combination of a driving-shaft, a shaft driven by said shaft, means on the latter shaft for winding a wire helix, a box arranged to reciprocate on the latter shaft, a pair of arms carried by said box and arranged to control said helix, a shaft arranged transverse to said winding-shaft and driven by said driving-shaft, an eccentric on said latter shaft, a second box arranged to be reciprocated in a direction parallel with said reciprocating box, an eccentric-rod connecting said eccentric with said second box to reciprocate said box, and a rod connecting said boxes.

22. The combination with means for forming a wire helix, of means for grasping the helix at its free extremity, and means for deflecting the helix to cause its free extremity to enter said grasping means.

23. The combination with means for forming a wire helix, of means for grasping the helix at its free extremity, and means for deflecting the helix to cause its free extremity to enter said grasping means, said means comprising a driving-shaft an eccentric on said shaft, an arm contacting with said helix, a pivoted lever arranged to impinge on said arm, and an eccentric-rod connecting said lever with said eccentric.

24. The combination, of a pair of grasping-arms for grasping the last winding of a wire helix and holding it to form a link therefrom, means for moving said arms simultaneously, and means for moving each arm separately.

25. The combination of a pair of grasping-arms arranged to grasp the last winding of a wire helix and holding it to form a link therefrom, a pivot for said grasping-arms, means for supporting the pivot stationary, and suitable operating mechanism.

26. The combination, of a pair of grasping-arms for grasping the last winding of a wire helix and holding it to form a link therefrom, a pivot, means for supporting the pivot stationary, said grasping-arms being arranged to oscillate on said pivot, means for moving said arms together, and means for moving each arm separately.

27. The combination, of a pair of grasping-arms for grasping the last winding of a wire helix and holding it to form a link therefrom, a stationary pivot on which said arms are arranged to oscillate, means tending to retain one of said arms in the closed position, means for operating said latter arm against the force of said closing means, and means for operating the other said grasping-arm in both directions.

28. The combination with means for grasping the last winding of a wire helix to form a link therefrom, of means arranged to cause said grasping means to carry the link forward in order to hook it on a previously-formed link, means arranged to then hold the link stationary, means arranged to then advance the link farther forward in order to close the link, means arranged to then return the link to an intermediate position to have it removed from the grasping-arm, and means arranged to finally return the grasping means to the first-mentioned position for grasping another winding to form another link.

29. The combination of means for grasping an open link, means for supporting a previously-formed link, means for advancing the grasping means in order to carry the said open link forward and hook it into said previously-formed link, said latter means also arranged to then carry the grasping means and link farther forward, a closing means arranged in the path of the open link to be impinged upon during the said further advancement of the link in order to bring the extremities of the open link into apposition, said grasping means arranged to be then returned to an intermediate position in order to have the closed link grasped by said supporting means, said grasping means arranged to be then returned to the first-mentioned position in order to grasp another winding of the helix.

30. The combination of means for grasping the last winding of a wire helix, means for supporting a previously-formed link, means arranged to advance said grasping means and thereby carry said open link forward and hook it into said formed link, means arranged to next cause said supporting means to release said formed link, means arranged to next cause said supporting means to retreat from said grasping means, means arranged to next carry said grasping means and open link farther forward, a closing means arranged in the path of the open link to bring together the ends of said open link, means arranged to next return said supporting means to a former intermediate position, means arranged to next return said grasping means to a former position and thereby bring the now-closed link in proximity to said supporting means, means arranged to next cause said supporting means to grasp said closed link, means arranged to next cause said grasping means to release said closed link and means arranged to next return said grasping means to said first-mentioned position in order to grasp another open link.

31. The combination, of means for severing the last winding of a wire helix, comprising a box, means for supporting the box on which it can be reciprocated, a pair of knives mounted on said box, means for reciprocating said box in order to bring said knives in proximity to said winding, and means for causing said knives to sever said wire.

32. The combination, of means for severing the last winding of a wire helix, comprising a box, a pair of knives mounted on said box, a support on which said box can be reciprocated in order to bring said knives in proximity to said winding, a spring arranged to move said box and the knives away from said winding, a driving-shaft, a cam on said shaft, a rod connected to said box and having its free extremity arranged to be impinged on by said cam in order to move the box against the force of said spring and bring said knives in proximity to said winding, and means for causing said knives to sever said winding.

33. The combination, of means for severing the last winding of a wire helix, comprising a pair of knives, means for bringing said knives in proximity to said winding, and means for moving one of said knives toward the other knife to sever said wire.

34. The combination, of means for severing the last winding of a wire helix, comprising a box, a knife rigidly supported on said box, a knife pivotally mounted on said box, a support on which said box can be reciprocated, means for reciprocating said box to bring said knives into proximity with said winding, a driven shaft, a disk mounted on said shaft, a lug on said disk arranged to impinge on the free extremity of said knife when said knives are in proximity to said winding and thus cause said knives to sever said winding.

35. The combination with means for grasping an open link and carrying it forward, of a block arranged in the path of movement of the link for closing the link when brought against it by said grasping means.

36. The combination with means for grasping an open link and carrying it forward, of a block arranged in the path of movement of the link for closing the link when brought against it by said grasping means, said block being normally retained out of said path of the link, and means for moving said block into said path.

37. The combination with means for grasping an open link and carrying it forward, of a block arranged in the path of movement of said link for closing the link when brought against it by said grasping means, a support on which said block is arranged to reciprocate, said block being normally retained out of said path of the link, a rod secured to said block, a driven shaft, a disk on said shaft, a crank-pin on said disk, and a lever having one extremity engaging said block and its other extremity acted on by said crank-pin in order to move said rod and bring said block into the path of the open link.

38. The combination of means for grasping the last winding of a wire helix and forming a link therefrom, said means comprising a fixed pivot, a pair of grasping-arms oscillatingly mounted on said pivot, means tending to retain one of said arms in the closed position, a stop for limiting the movement of said arm by said latter closing means, and means for moving the other said arm in both directions.

39. The combination of means for grasping the last winding of a wire helix and forming a link therefrom, said means comprising a fixed pivot, a pair of grasping-arms oscillatingly mounted on said pivot, a helical spring connecting one of said arms with a fixed part of the machine for drawing said arm toward the closed position, and means for positively moving the other arm in both directions.

40. The combination of means for grasping the last winding of a wire helix and forming a link therefrom, said grasping means comprising a fixed pivot, a pair of arms oscillatingly mounted on said pivot, means for operating one of said arms intermittently, said latter means comprising a drum having a two-stepped cam-slot, a pivoted lever, levers connecting said arm with one end of said pivoted lever, and a projection on the other end of said pivoted lever arranged to engage said cam-slot in order to cause said drum to operate said arm.

41. The combination with means for grasping the last winding of a wire helix to form a link therefrom, said means comprising a fixed pivot, and a pair of grasping-arms oscillatingly mounted thereon, of means for moving one of said arms comprising a retractile spring connecting said arm with the frame of the machine and tending to retain the arm in one position, a stop for limiting the movement of the arm by said spring, a bent lever, a driven shaft, a crank on said shaft, a pin on said crank arranged to impinge on one end of said bent lever in order to rock said lever, and a projection on the other end of said bent lever arranged to engage said grasping-arm in order to move it against the action of said retractile spring.

42. The combination with means for forming a link, of a rotatable support, a plurality of means for grasping said link, said grasping means being mounted radially on said support, and arranged to grasp the successive links to form a chain on said means, and means arranged in the path of movement of said grasping means for joining the ends of said link by solder.

43. The combination with means for forming a link, of a rotatable support, a plurality of means for grasping said link that are mounted radially on said support and arranged equidistant from each other and from the axis of the support, means for applying flux to said links held by said grasping means, means for applying solder to said links, means for applying heat to said links to solder them, said three last-mentioned means being disposed in the path of movement of said plurality of grasping means and in the sequence above mentioned, and means for rotating said support by a step-by-step movement in order to bring said links to be acted on successively by said fluxing, solder-applying, and heating means.

44. The combination with means for holding a link to be soldered, of a vessel for containing powdered solder, means for bringing said link in proximity with said vessel, and means for automatically depositing solder from said vessel on said link when brought into said position.

45. In a chain-making machine, the combination with means for forming a link, of a vessel for containing a powdered solder, a tube projecting from said vessel, a plunger reciprocating in said tube, means for bringing said link from the link-forming means in proximity to the free end of said tube, and means for reciprocating said plunger to cause the solder from said vessel to be deposited on said link.

46. In a chain-making machine, the combination with means for forming a link to be soldered, of a vessel for containing powdered solder, a tube projecting from said vessel, a plunger reciprocating in said tube, means for bringing said link from the link-forming means in proximity to the free end of said tube, means for reciprocating said plunger to cause the solder to be deposited on said link, said means comprising a bent pivoted lever, having one arm connected with said plunger, a driven shaft, a disk mounted on said shaft, a pin on said disk, a second pivoted lever having one end engaging said pin, and a bar connecting the other end of said latter lever with one arm of said bent lever.

47. In a chain-making machine, the combination with means for forming a link, and means for soldering the same, of a rotatable support, means for rotating said support, a pair of grasping-arms, one of said arms being rigidly mounted on said support, the other arm being pivoted on said arm and having its extremity movable to and from said arm, said arms being adapted to grasp the link whereby when the support is rotated the link will be carried from the link-forming means to the soldering means, a rod reciprocating on said support, a lever connecting said pivoted arm with said rod, a spring on said rod tending to cause it to retain said grasping-arms together, and means for moving said rod against the force of said spring in order to open said arms.

48. In a chain-making machine, the combination with means for forming a link, and means for soldering the same, of a rotatable support, means for rotating said support, a pair of grasping-arms, one of said arms being rigidly mounted on said support, the other arm being pivoted on said arm and having its extremity movable to and from said arm, a rod reciprocating on said support, a lever connecting said pivoted arm with said rod, a spring on said rod tending to cause it to retain said grasping-arm in contact, and means on the machine separate from the rotatable support for automatically moving said rod to operate said grasping-arm.

49. In a chain-making machine, the combination with means for forming a link, and means for soldering the same, of a rotatable support, means for rotating said support, a pair of grasping-arms, one of said arms being rigidly mounted on said support, the other arm being pivoted on said arm and having its extremity movable to and from said arm, a rod reciprocating on said support, a lever connecting said pivoted arm with said rod, a spring on said rod tending to cause it to retain said grasping-arms in contact, means for moving said rod against the force of said spring in order to open said arms, and means on the machine separate from said support for operating said rod, said means comprising a pivoted lever having one end arranged to impinge on said rod, a driven shaft, a disk on said shaft, and crank-pins on said disk arranged to engage said pivoted lever and cause the lever to move said rod against the force of said spring in order to separate said grasping-arms.

50. In a chain-making machine, the combination with the means for forming the link, and means for soldering the same, of a rotatable support and means on said support for conveying the link from the forming means to the soldering means, a disk mounted on said support, a plurality of pins on the face of said disk, a lever arranged to engage said pins and move the disk, and means for reciprocating said lever in order to impart to the support a step-by-step movement.

51. In a chain-making machine, the combination with means for forming a link, and means for soldering the same, of a rotatable support, means carried by said support to convey the link from the forming means to the soldering means, means for rotating the support by a step-by-step movement, said means comprising a disk mounted on said support, a plurality of pins on the face of said disk, a lever, a driven shaft, an eccentric on said shaft, an eccentric-rod connected to said eccentric and hinged to said lever, a spring bearing on said latter hinged joint tending to keep said lever and eccentric-rod in line, and a lug on said lever arranged to engage one of said pins in order to rotate said support, said lug having a beveled edge so as to move said pin and disk in one direction only.

52. In a chain-making machine, the combination with means for forming a link, and means for soldering the same, of a rotatable support, means carried by said support to convey the link from the forming means to the soldering means, means for rotating the support by a step-by-step movement, a disk arranged on said support, a number of pins projecting from the face of said disk, and a spring-lever arranged to bear on an adjacent pair of said pins in order to hold said support stationary at certain parts of its revolution.

53. In a chain-making machine, the combination with means for forming a link, and means for soldering the same, of a rotatable support, means carried by said support to convey the link from the forming means to the soldering means, means for rotating the support by a step-by-step movement in one direction, and means for rotating said support in the opposite direction at the end of each of said steps of rotation a short distance, said latter means also arranged to retain said support in said latter positions.

54. In a chain-making machine, the combination with means for forming a link, and means for soldering the same, of a rotatable support, means carried by said support to convey the link from the forming means to the soldering means, means for rotating the support by a step-by-step movement in one direction, means for rotating said support in the opposite direction at the end of each of said steps of rotation a short distance, said latter means also arranged to retain said support in said latter positions, said latter means comprising a disk mounted on said support, a number of pins projecting from the face of said disk, and a spring-lever arranged to have its side face at its free end bearing on said pins, said face having an apex one of whose sides engages one of said pins and rotates the support in said opposite direction until the other side face of the apex engages an adjacent pin in order to hold said support stationary.

55. In a chain-making machine, the combination with means for forming a link, and means for soldering the same, of a rotatable support, means carried by said support to convey the link from the forming means to the soldering means, means for rotating the support by a step-by-step movement, means for rotating said support in the opposite direction to said rotation at the end of each of said steps of movement, and means for again rotating the support in said former direction to its said former position at the end of said steps of movement.

56. In a chain-making machine, the combination with means for forming a link, and means for soldering the same, of a rotatable support, means carried by said support to convey the link from the forming means to the soldering means, means for rotating the support by a step-by-step movement in one direction, means for rotating the support in the opposite direction at the end of each of said steps of movement, and means for again rotating said support in said former direction to its said former position at the end of said step of movement, said latter means comprising a disk mounted on said support, a plurality of pins on the face of said disk, a lever, a driven shaft, an eccentric on said shaft, an eccentric-rod connected to said eccentric and hinged to said lever, a spring bearing on said latter hinged joint and tending to keep said eccentric-rod and lever in line, and a lug on said lever arranged to engage one of said pins and rotate said support, said lug having a beveled edge arranged so as to move said pin and disk in one direction only.

57. In a chain-making machine, the combination with means for forming a link, and means for soldering the same, of a rotatable support, means carried by said support to convey the link from the forming means to the soldering means, a disk mounted on said support, a plurality of pins on the face of said disk, a driven shaft, an eccentric on said shaft, an eccentric-rod connected to said eccentric, a lever hinged to said eccentric-rod, a spring bearing on said latter hinged joint and tending to keep said lever and eccentric-rod in line, a lug on said lever arranged to engage said pins successively and rotate said support, said lug having a beveled edge arranged so as to move said pin and disk in one direction only, means for rotating said support backwardly at the end of each of the steps of movement imparted by said eccentric and connected parts, a second eccentric, means for driving said latter eccentric, a second eccentric-rod connected to said latter eccentric, a lever hinged to said latter eccentric-rod, a spring bearing on said latter hinged joint and tending to keep said eccentric-rod and lever in line, a lug on said latter lever arranged to engage said pins successively but on the opposite side of said disk from that engaging said former lug, said latter lug having a beveled edge arranged so as to move said pins in one direction only.

58. In a chain-making machine, the combination with means for forming links in connected series; of means for holding a link to be soldered, a vessel for containing powdered solder, means for bringing said link in proximity with said vessel, and means for automatically depositing solder from said vessel on said link when brought into said position.

59. In a chain-making machine, the combination with means for forming links in connected series; of means for holding a link to be soldered, a vessel for containing a powdered solder, a tube projecting from said vessel, a plunger reciprocating in said tube, means for bringing said link in proximity to the free end of said tube, and means for reciprocating said plunger to cause the solder from said vessel to be deposited on said link.

60. In a chain-making machine, the combination with means for forming links in connected series; of means for holding a link to be soldered, a vessel for containing powdered solder, a tube projecting from said vessel, a plunger reciprocating in said tube, means for bringing said link in proximity to the free end of said tube, means for reciprocating said plunger to cause the solder to be deposited on said link, said means comprising a bent pivoted lever having one arm connected with said plunger, a driven shaft, a disk mounted on said shaft, a pin on said disk, a second pivoted lever having one end engaging said pin, and a bar connecting the other end of said latter lever with one arm of said bent lever.

In testimony whereof I affix my signature in presence of two witnesses.

LUDWIG BRUCKMANN.

Witnesses:
 A. DRAUTZ,
 HERM. WAGNER.